United States Patent [19]
Katagiri

[11] Patent Number: 5,610,677
[45] Date of Patent: Mar. 11, 1997

[54] CAMERA

[75] Inventor: Moriya Katagiri, Tachikawa, Japan

[73] Assignee: Olympus Optical Co., Ltd., Tokyo, Japan

[21] Appl. No.: 254,961

[22] Filed: Jun. 7, 1994

[30] Foreign Application Priority Data

Jun. 8, 1993 [JP] Japan .................................. 5-137553

[51] Int. Cl.⁶ .................................................... G03B 1/18
[52] U.S. Cl. ........................................................ 354/173.1
[58] Field of Search ........................... 354/173.1, 173.11, 354/195.1

[56] References Cited

FOREIGN PATENT DOCUMENTS 2-67534  9/1990  Japan .
54920    5/1991  Japan .

Primary Examiner—David M. Gray
Assistant Examiner—Christopher E. Mahoney
Attorney, Agent, or Firm—Louis Weinstein

[57] ABSTRACT

A film transport device in a camera is provided with a fork shaft for rotating a film wind shaft in a film patrone, a spool shaft for taking up a film, a drive shaft located between the spool shaft and the fork shaft and movable almost in parallel with the film advance direction and in the axial direction to be rotated forward and backward by a drive source, a first connecting shaft located coaxially with the drive shaft and movably in the axial direction to be integrally rotated in engagement with the drive shaft and engaged with the fork shaft through a helical spur gear, and a second connecting shaft located coaxially with the drive shaft and movably in the axial direction, and engaged with the spool shaft through a helical spur gear to rotationally drive the spool shaft in correlation to the rotation of the drive shaft.

14 Claims, 13 Drawing Sheets

CAMERA

BACKGROUND OF THE INVENTION

1. Field of the Invention

The present invention relates to a camera, and more particularly, to a film transport device in a camera which feeds a film out from a film patrone by rotating a film winding shaft in the film patrone in the film advance direction.

2. Description of the Related Art

Such type of film transport device of a camera is disclosed in Japanese Laid-open Patent Application No. 67534 of 1990. In this film transport device, a film is fed out by driving a fork shaft engaged with a film winding shaft in a film patrone to rotate the winding shaft and a film take-up spool shaft, a one-way clutch of the fork shaft is freed in correlation to the difference in peripheral speed between the fork shaft and the spool shaft when the film is caught by the spool shaft, and the spool shaft is driven to take up the film. The film is rewound by driving the fork shaft, and at this time, the one-way clutch of the spool shaft is brought into a driven state by friction.

Another related art similar to the above mentioned document disclosed in Japanese Laid-open Utility Model Application No. 54920 of 1991.

However, since the former of the above conventional film transport devices is constituted by the combination of a train of spur gears and one-way clutches and the latter is constituted by the combination of a train of spur gears and planetary clutches, the number of components is large and a lot of space is required, resulting in the enlargement of a camera and increased cost.

SUMMARY OF THE INVENTION

A main object of the present invention is to provide a film transport device in a camera which is free of the above disadvantages of conventional cameras and firmly takes up and rewinds a film in a simple structure.

Another object of the present invention is to provide a film transport device in a camera which switches the transmission of driving forces of a fork shaft and a spool shaft with the ingenious use of the lead angle of a helical gear for rotating the spool shaft formed on a drive shaft to rotationally drive the fork shaft and/or the spool shaft, the lead angle of a helical gear formed on the drive shaft to rotate the fork shaft, the film take-up velocity of the spool shaft and the film feed out velocity of the fork shaft.

In brief, a film transport device of the present invention comprises a drive shaft which has a helical gear engaged with a helical spur gear for driving a spool shaft and to which the rotational driving force of a motor is transmitted, and a rewind driving shaft which is located coaxial with and detachable from the drive shaft through a coupler and has a helical gear engaged with a helical spur gear to drive a fork shaft for feeding out or rewinding a film in a patrone, and performs film feed out, take-up and rewind operations by moving these drive shafts in the axial direction.

The above and further objects and advantages of the present invention will appear more fully from the following detailed description.

DETAILED DESCRIPTION OF PREFERRED EMBODIMENTS

Before describing embodiments of the present invention, the concept of the present invention will be explained with reference to FIGS. 1 to 4. In the following explanation, the left side or the leftward direction means the take-up direction of a film, and the right side or the rightward direction means the rewind direction of the film.

Figure 1:
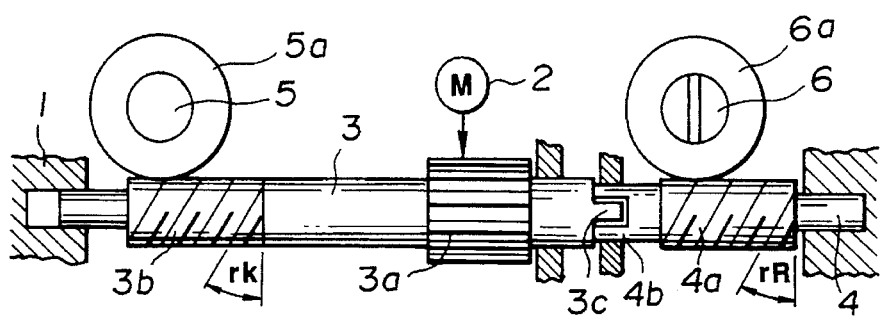
FIG. 1 is a conceptual view of a film transport device of a camera according to the present invention.

FIG. 1 illustrates an initial state of a film transport device of a camera. A spool shaft 5 for taking up a film fed out from a film patrone is pivotally (i.e. rotatably) supported by a camera body 1 on the left side in the figure so as to be rotatable about an axis aligned perpendicular to the plane of FIG. 1, and fixed to a helical spur gear 5a at the bottom surface thereof. On the right side, a fork shaft 6 detachably engaged with a wind shaft in the film patrone is also pivotally (i.e. rotatably) supported by the camera body 1 so as to be rotatable about an axis perpendicular to the plane of FIG. 1 and a helical spur gear 6a is fixed to the bottom end surface thereof.

A drive shaft 3 is horizontally aligned and is located under the spool shaft 5 in the figure, and is pivotally supported by the camera body 1 at both ends thereof so as to be rotatable and slidable in the rightward and leftward directions. The drive shaft 3 is provided with a helical gear 3b engaged with the helical spur gear 5a on the left side thereof, a spur gear 3a for receiving the driving force from a motor 2 as a drive source at almost the center thereof, and a coupler 3c for detachable engagement with a rewinding drive shaft 4 as a first connecting shaft, described below, at the right end thereof.

The motor 2 is integrally supported with the camera body 1, and the driving force thereof is transmitted to the spur gear 3a of the drive shaft 3 through unillustrated gears, for simplicity.

The rewinding drive shaft 4 is rotatably mounted under the fork shaft 6 in the figure, and is supported by the camera body 1 so as to be slidable in the rightward and leftward directions. The rewinding drive shaft 4 is also provided with a helical gear 4a engaged with the helical spur gear 6a at the center thereof, and a coupler 4b detachable from the coupler 3c and integrally formed at the left end thereof. A relationship between a lead angle rk of the helical gear 3b of the drive shaft 3 and a lead angle rR of the helical gear 4a of the rewinding drive shaft 4 is rk≦rR.

Figure 2:
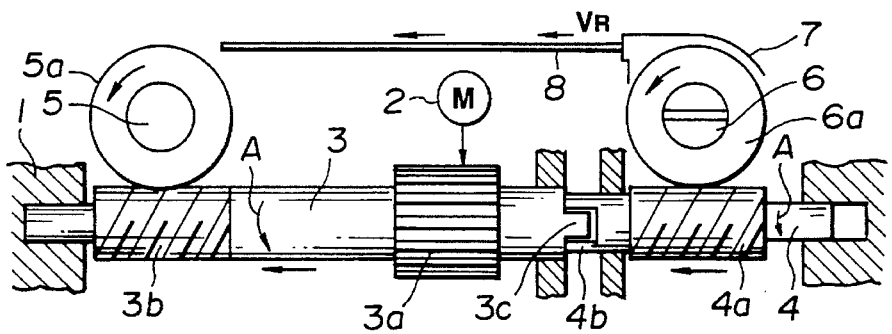
FIG. 2 is a motion view illustrating the film feed out state in the device shown in FIG. 1.

In the film transport device having the above construction, both the drive shaft 3 and the rewinding drive shaft 4 are positioned on the right side of the figure in the initial state shown in FIG. 1, and the couplers 3c and 4b are connected to each other. As shown in FIG. 2, when an unillustrated detecting means detects a film patrone 7 has been loaded, the motor 2 rotates forward and both the drive shaft 3 and the rewinding drive shaft 4 rotate in the direction of the arrow A in the figure.

In this state, the linear loads of the drive shaft 3 and the rewinding drive shaft 4 are set to be lighter than the rotation loads of the spool shaft 5 and the fork shaft 6, and a propelling power is generated in relation to the lead angles rk and rR of the helical gears 3b and 4a, thereby shifting the drive shaft 3 and the rewinding drive shaft 4 leftward in the figure.

For example, if rk=rR, the spool shaft 5 and the fork shaft 6 do not rotate, and the drive shaft 3 and the rewinding drive shaft 4 move with equal velocity. If rk<rR, the drive shaft 3 is pushed leftward by the fork shaft 6, and the spool shaft 5 rotates clockwise in the figure. As a result, the drive shaft 3 and the rewinding drive shaft 4 move with equal velocity. On the other hand, if rk>rR, since the movement velocity of the drive shaft 3 becomes higher than that of the rewinding drive shaft 4 and the couplers 3c and 4b are separated from each other, the rewinding drive shaft 4 cannot be driven.

When the movement of the drive shaft 3 and the rewinding drive shaft 4 to the left in the figure is completed, the spool shaft 5 and the fork shaft 6 rotate counterclockwise in the figure. Then, a leading end portion of a film 8 in the film patrone 7 is fed out and passed through an unillustrated film holding portion of the camera body 1, and the film 8 is transported toward the spool shaft 5 at a velocity VR.

Figure 3:
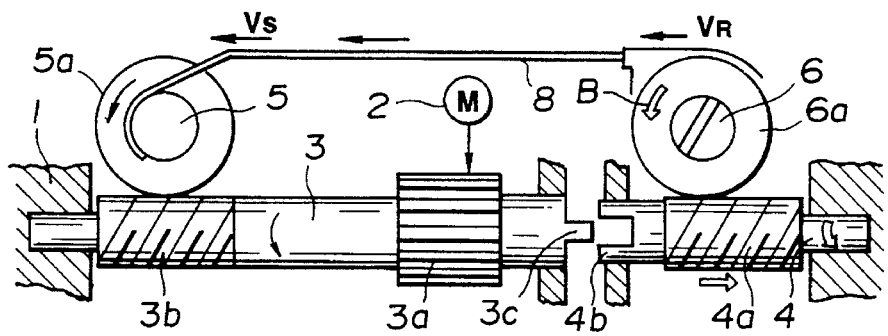
FIG. 3 is a motion view illustrating the film take-up state in the device shown in FIG. 1.

Then, as shown in FIG. 3, one (8a—see FIG. 7) of perforations of the film 8 is caught by a retaining nail (not shown) of the spool shaft 5. When the film 8 is caught by the retaining nail of the spool shaft 5, it is wound about the spool shaft 5 at a velocity VS. The film take-up velocity VS of the spool shaft 5 and the film feed out velocity VR of the fork shaft 6 are set so that VS≧VB.

Accordingly, the fork shaft 6 is driven in the direction of the arrow B in the figure by the film 8, and the rewinding drive shaft 4 is shifted rightward in the figure by the fork shaft 6, thereby disconnecting the couplers 3c and 4b. Then, the film 8 is taken up only by the spool shaft 5, and the rewinding drive shaft 4 and the fork shaft 6 rotate in the direction of the arrow A in the figure while being driven by the spool shaft 5. This state is similar to the take-up state of a well-known spool drive.

Figure 4:
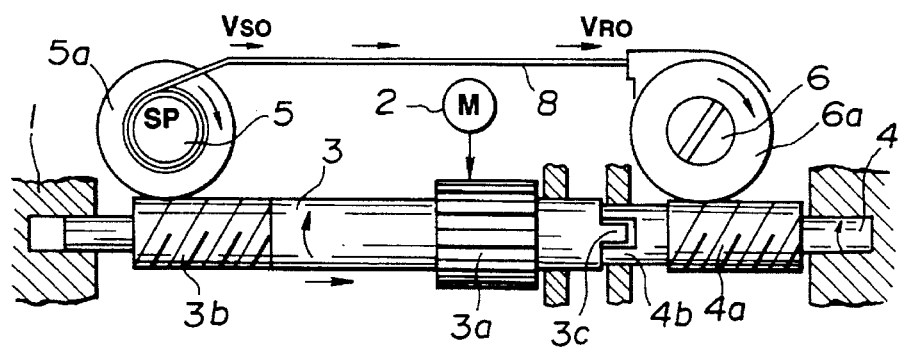
FIG. 4 is a motion view illustrating the film rewind state in the device shown in FIG. 1.

FIG. 4 illustrates the film rewind state. When the motor 2 is reversely rotated, the drive shaft 3 is rotated in the direction reverse to that of the arrow A in FIG. 2, and shifted rightward by the helical gear 3b. Since the couplers 3c and 4b are connected again when the drive shaft 3 reaches the right end, the spool shaft 5 and the fork shaft 6 are rotated clockwise in the figure (reversely to the direction of the arrow B of FIG. 3), and the film 8 is rewound into the patrone 7 by the fork shaft 6.

A rewind velocity VR0 of the film 8 by the fork shaft 6 is set to be lower than a feed out velocity Vs0 of the film 8 by the spool shaft 5 |Vs0≧VR0|. Therefore, the film 8 is unwound, the retaining nail of the spool shaft 5 is disengaged from the perforation of the film 8, and the film 8 is rewound in the well-known drive method of the fork shaft 6. Furthermore, in this case, a well-known type of one-way clutch may be interposed between the gear portion of the spool shaft 5 and the fork shaft 6.

The above is the concept of the present invention.

Figure 5:
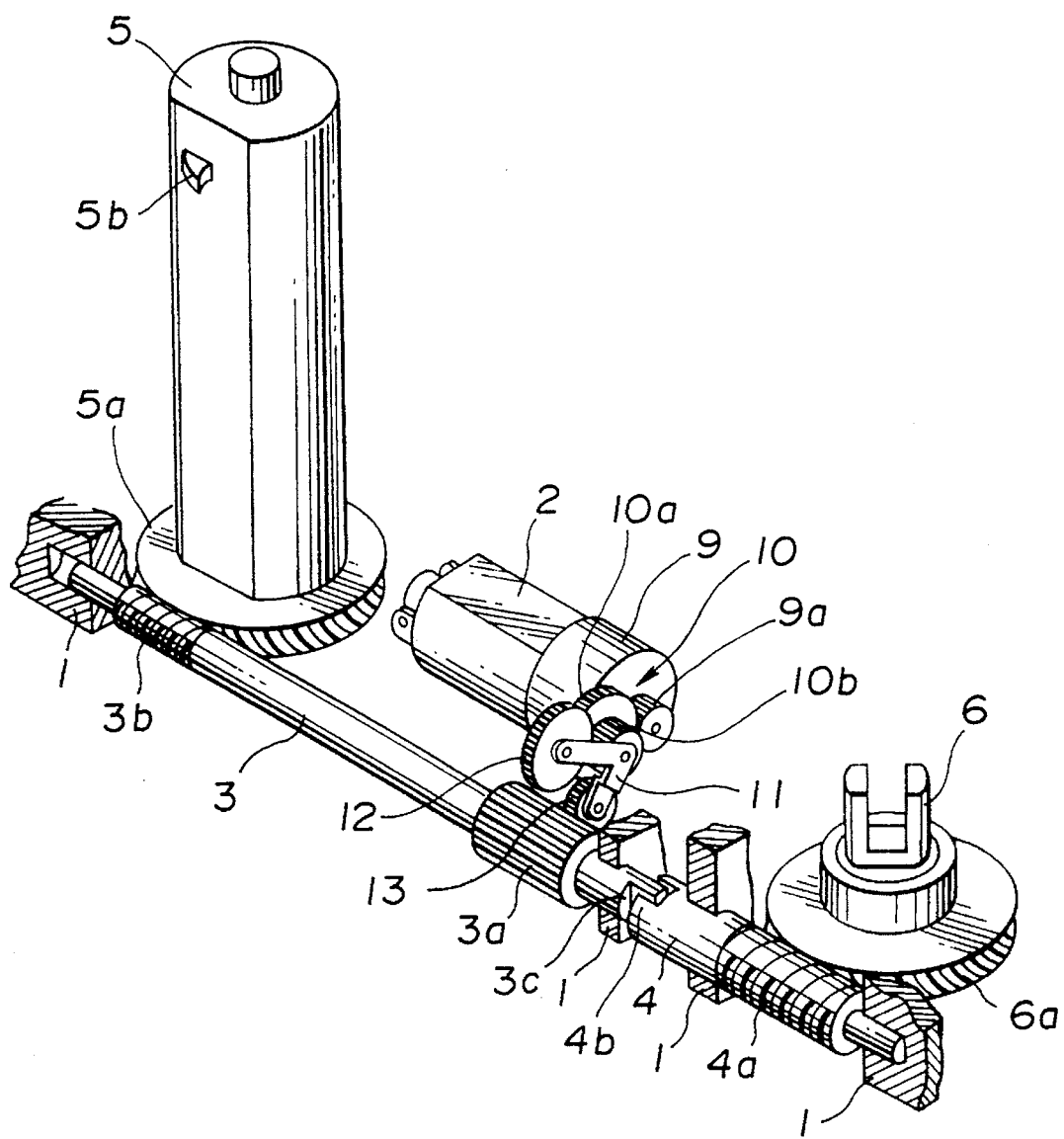
FIG. 5 is a perspective view illustrating the principal part of a film transport device of a camera according to a first embodiment of the present invention.

FIG. 5 is a perspective view of a film transport device according to a first embodiment of the present invention.

A motor 2 as a drive source is fixed to a camera body 1, which is partially illustrated in cross-section, through an appropriate means. A reduction gear box 9 is integrally mounted to the side of an output shaft of the motor 2 (the right side in the figure), and pivotally and rotatably supports an output gear 9a performing reduced rotation at an outermost surface thereof.

The output gear 9a is engaged with a major diameter gear 10a of a sun gear 10 of a planetary gear mechanism. The sun gear 10 is a double gear formed by the major diameter gear 10a and a minor diameter gear 10b, and is rotatably and pivotally supported by the gear box 9. A rocking fulcrum of a carrier 11 formed as a bell crank lever is pivotally mounted to a support shaft of the sun gear 10. The carrier 11 rotatably supports a major diameter planetary gear 12 engaged with the minor diameter gear 10b of the sun gear 10 at one end thereof, and a minor diameter planetary gear 13 engaged with the major diameter gear 10a of the sun gear 10 at the other end thereof.

Load is applied between the planetary gears 12 and 13 as necessary in a well-known method of inserting a compression spring in the thrust direction and so on. The load enables the carrier 11 to keep its position opposed to unbalance of the moment caused by its own weight, and to revolve in correlation to the rotation of the sun gear 10, and the major diameter planetary gear 12 and the minor diameter planetary gear 13 are selectively engaged with a gear 3a to be described later.

A fork shaft 6 which is engaged with a film wind shaft 7a of a loaded patrone 7 (see FIG. 6) to transmit the rotation as shown on the right side in the figure has a helical spur gear 6a integrally formed with the bottom end portion thereof, and is rotatably and pivotally supported by the camera body 1.

A spool shaft 5 for taking up a film 8 (see FIG. 7) is rotatably and pivotally supported by the camera body 1 on the opposite side of the fork shaft 6 relative to the motor 2. The spool shaft 5 has retaining nails 5b to be engaged with perforations 8a of the film 8 on an upper peripheral surface thereof, and a helical spur gear 5a at a bottom end thereof. The retaining nails 5b are mounted in two symmetrical positions on flat surfaces of the spool shaft 5 having an oval cross section. Therefore, the leading ends of the retaining nails 5b are so formed as to be positioned in a virtual arc of the cross section of the spool shaft 5.

A drive shaft 3 rotatably and horizontally extends in front of the helical spur gear 5a and the planetary gears 12 and 13, and is supported by the camera body 1 so as to be rotatable and slidable in the rightward and leftward directions in the figure. The drive shaft 3 is provided with a helical gear 3b engaged with the helical spur gear 5a of the spool shaft 5 on the left side, and a coupler 3c at the right end thereof.

Furthermore, a rewinding drive shaft 4 is rotatably supported by the camera body 1 an is slidable in the rightward and leftward directions in the figure in front of the fork shaft 6. The rewinding drive shaft 4 is provided with a slotted coupler 4b selectively detachable from the coupler 3c of the drive shaft 3 at the left end thereof, and a helical gear 4a engaged with the helical gear 6a of the fork shaft 6 at the center thereof.

A lead angle rk of the helical gear 3b of the drive shaft 3 and a lead angle rR of the helical gear 4a of the rewinding drive shaft 4 (see FIG. 1) are in the relationship rk≦rR. A film take-up velocity VS of the spool shaft 5 in the film advance direction and a film feed out velocity VR of the fork shaft 6 are in the relationship VS≧VR. Furthermore, a film feed out velocity VS0 of the spool shaft 5 and a film rewind velocity VR0 of the fork shaft 6 in the film rewind direction is in the relationship $V_S 0 \geq V_R 0$.

The film transport device of the first embodiment is constituted as above. Then, the operation of the film transport device will be described with reference to flow charts shown in FIGS. 10 and 11.

Figure 6:
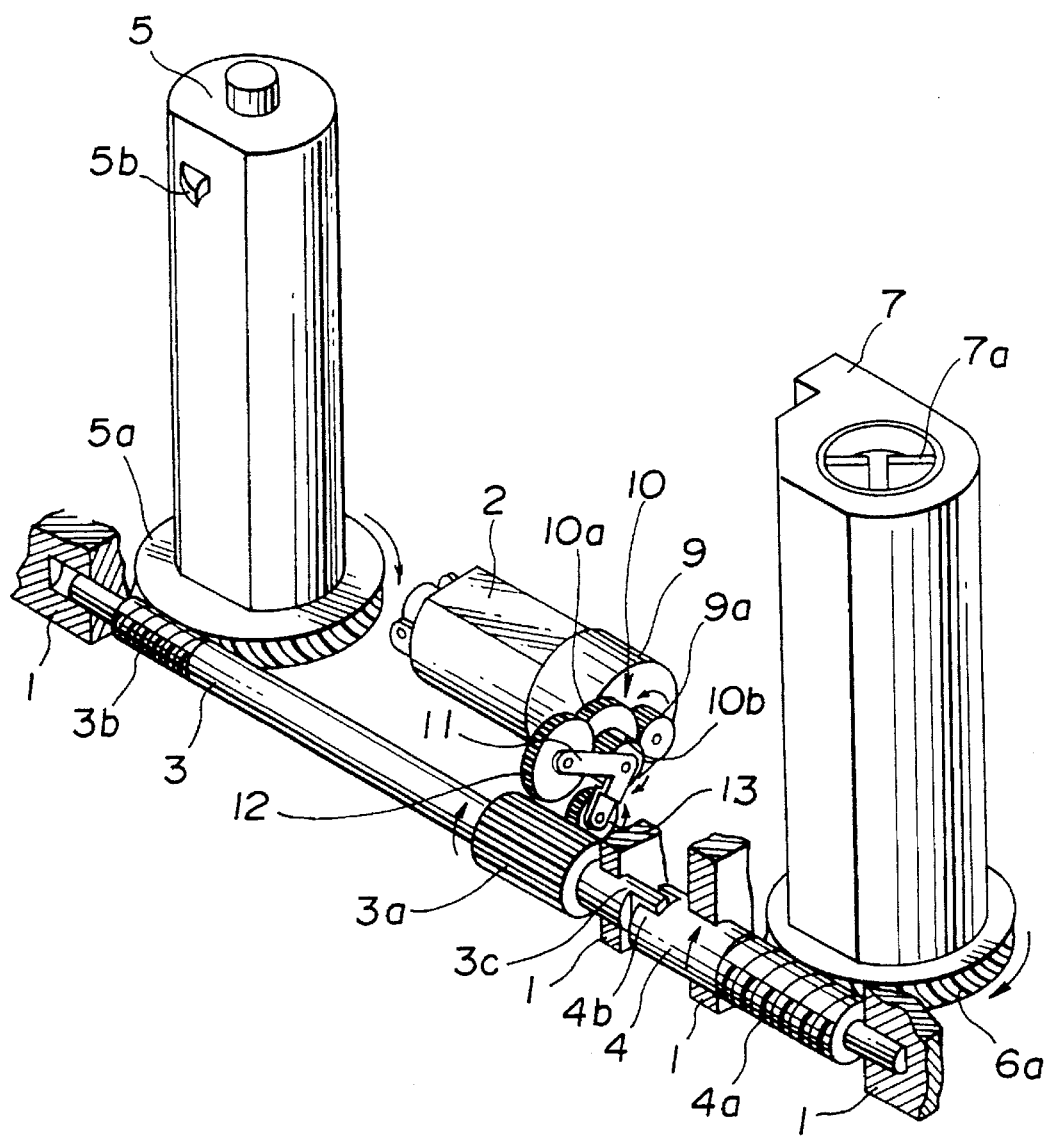
FIG. 6 is a perspective view illustrating the principal part of the reset state of the device according to the first embodiment.
Figure 10:
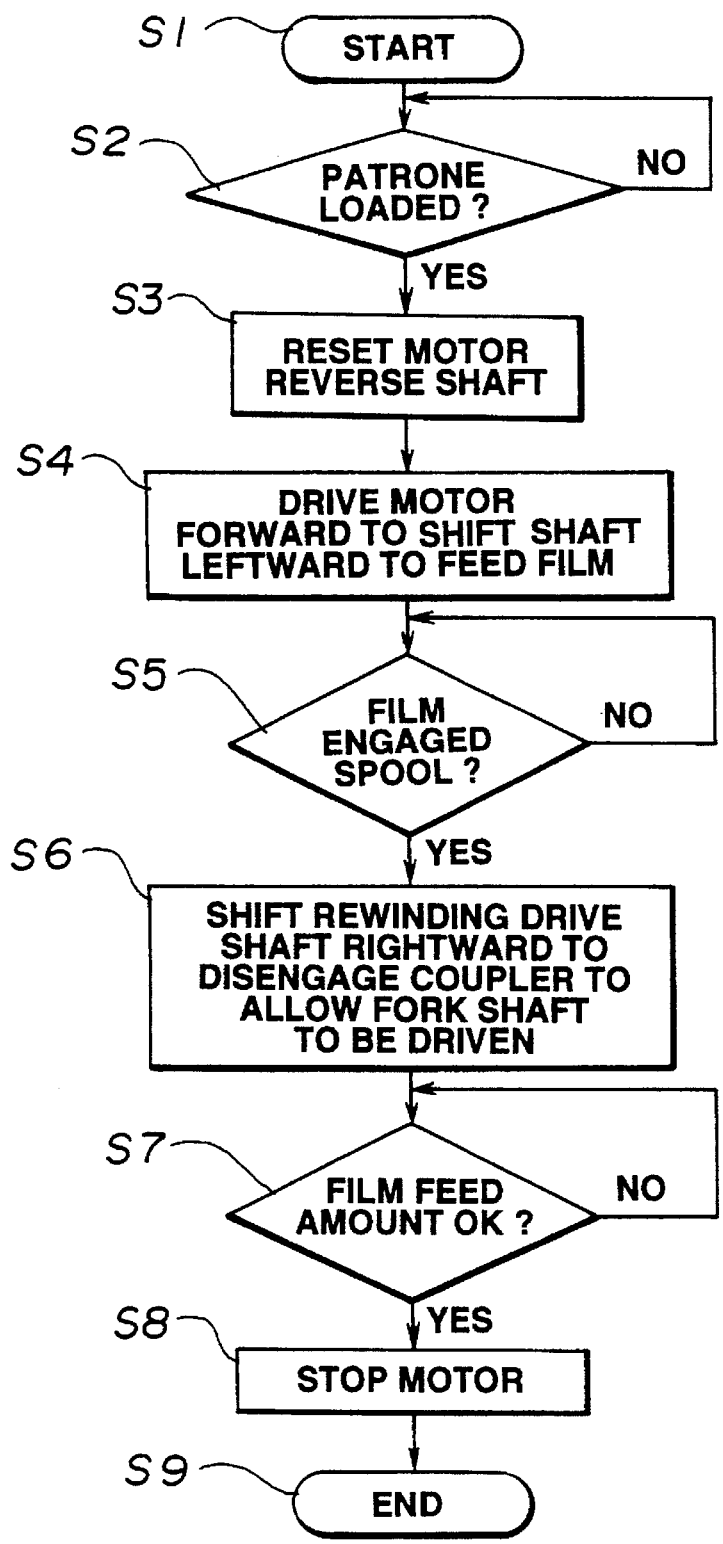
FIG. 10 is a flow chart showing an automatic loading operation of the device of the first embodiment.

FIG. 10 explains a so-called automatic loading operation. When the operation starts (Step S1) and an unillustrated detection means detects in Step S2 that a film patrone is loaded, the motor 2 is reversely driven and the drive shaft 3 and the rewinding drive shaft 4 are shifted rightward and reversely rotated for a predetermined period as shown in FIG. 6 (shaft reset).

Figure 7:
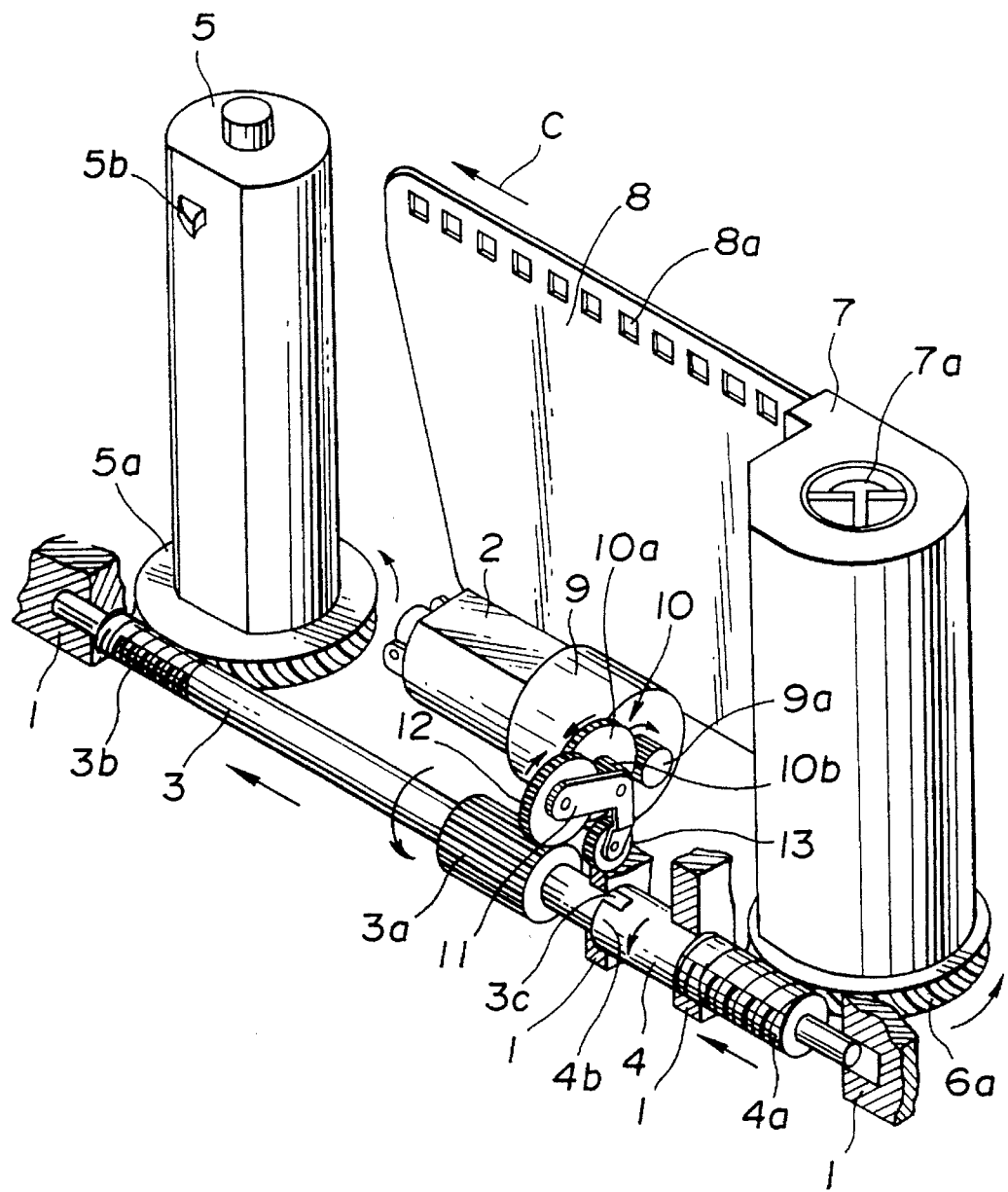
FIG. 7 is a perspective view illustrating the principal part of the film feed out state of the device according to the first embodiment.

After that, the motor 2 is driven forward in Step S4 as shown in FIG. 7. In correlation to the forward drive, the major diameter planetary gear 12 and the spur gear 3a of the drive shaft 3 are engaged with each other, and the drive shaft 3 and the rewinding drive shaft 4 are rotated in the direction of the arrow in the figure, shifted leftward, and brought into contact with a stopper portion of the camera body 1. In this position, the spool shaft 5 and the fork shaft 6 are rotated in the direction of the arrow. The rotation of the fork shaft 6 rotates the wind shaft 7a of the patrone 7, and then, the film 8 is fed out from the patrone 7 in the direction of the arrow C in FIG. 7.

Figure 8:
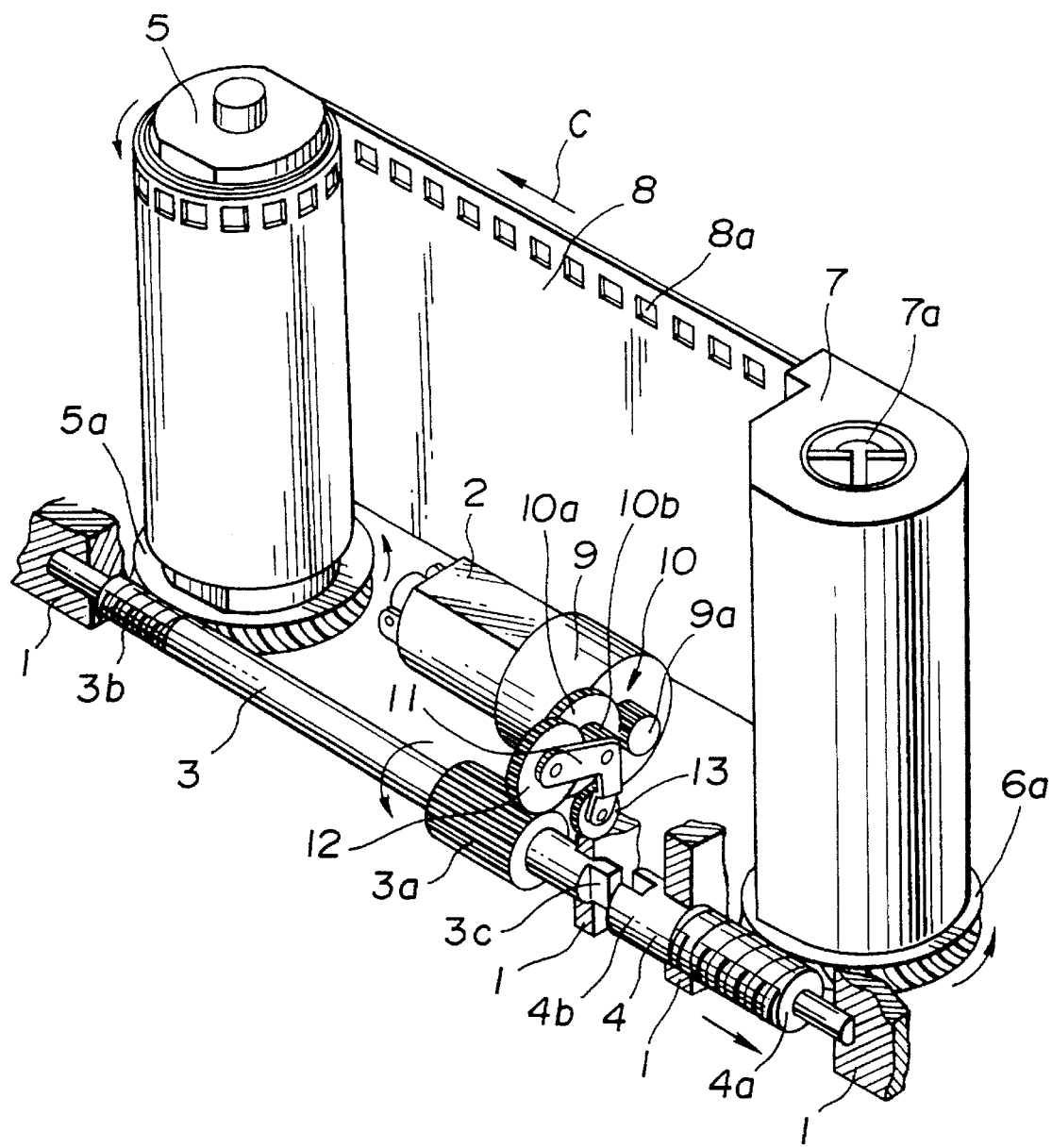
FIG. 8 is a perspective view illustrating the principal part of the film take-up state of the device according to the first embodiment.
Figure 9:
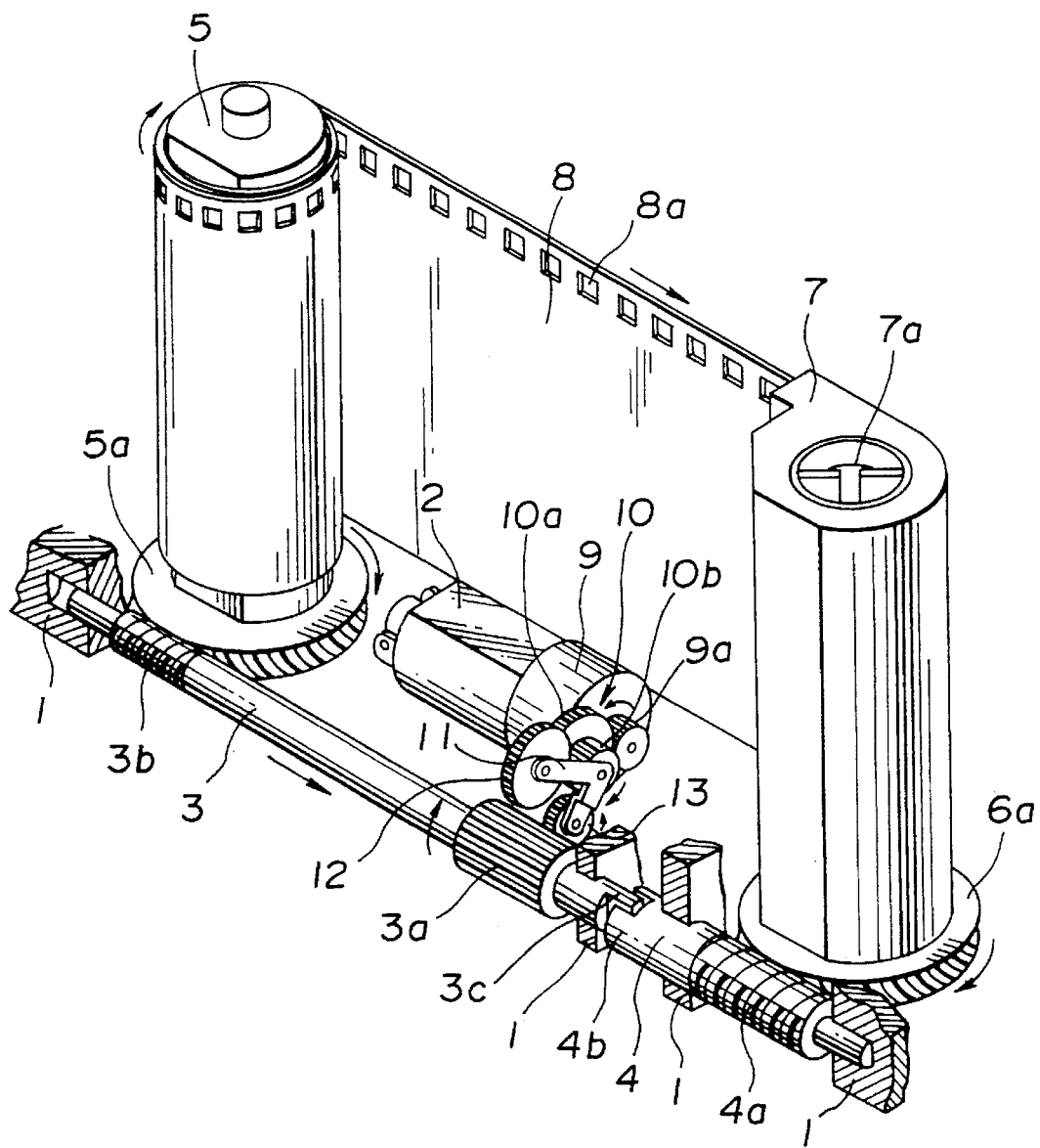
FIG. 9 is a perspective view illustrating the principal part of the film rewind state of the device according to the first embodiment.

In Step S5, determination is made as to whether the perforations 8a of the film 8 are engaged with the retaining nails 5b of the spool shaft 5. If so, the film 8 is now transported by the spool shaft 5. This is because the rotation velocity of the fork shaft 6 by the spool shaft 5 through the film 8 is higher than that by the drive shaft 3 according to the above condition VS≧VR. In Step S6, the rewinding drive shaft 4 is shifted to the right as shown in FIG. 8, the couplers 3c and 4b are separated from each other, and the rewinding drive shaft 4 and the fork shaft 6 are brought into the driven state.

When it is determined by an unillustrated film feed amount detection means in Step S7 that the film 8 is taken up by a predetermined amount, the motor 2 is stopped in Step S8, and the automatic loading operation is completed in Step S9.

Figure 11:
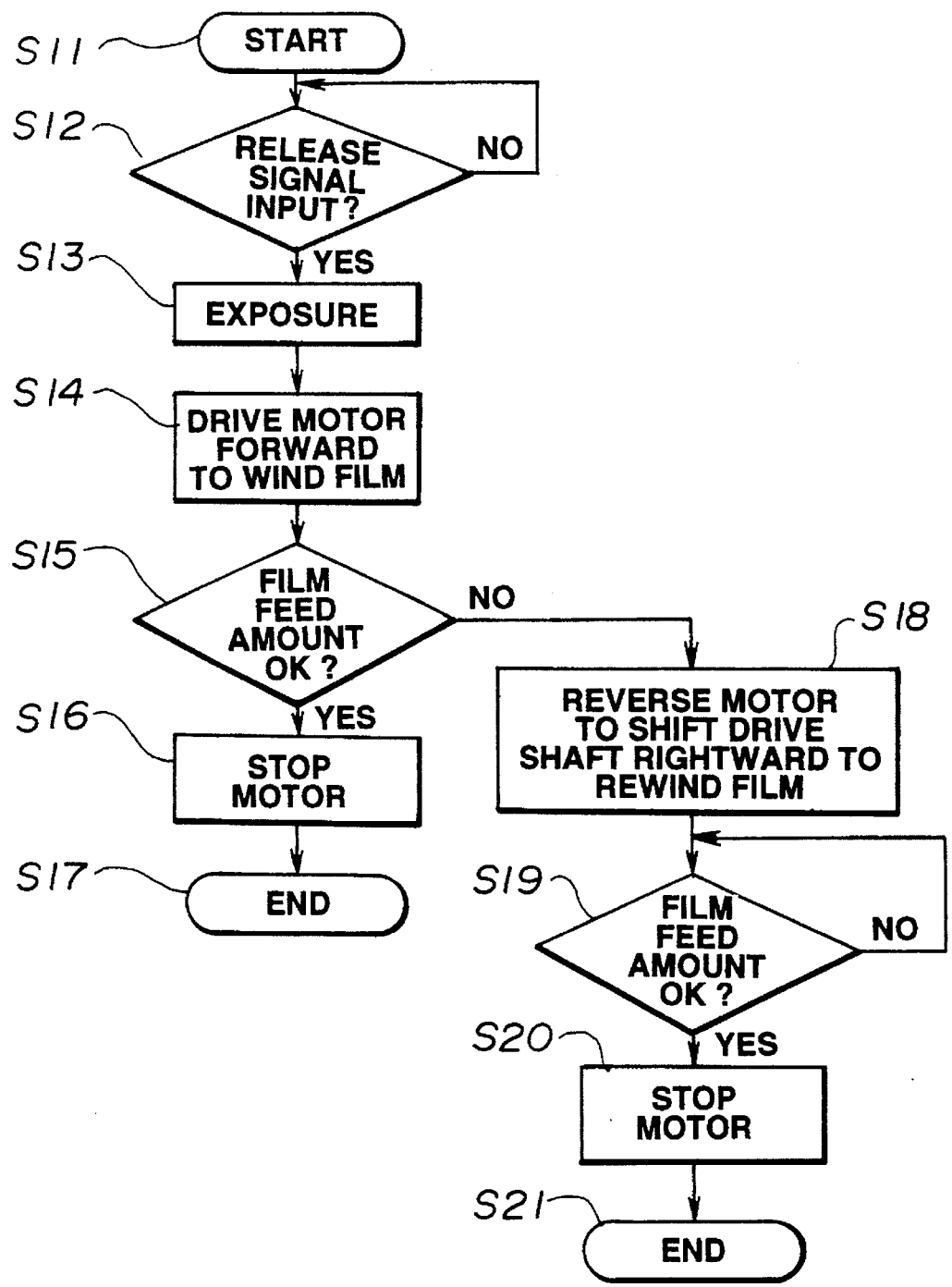
FIG. 11 is a flow chart showing one-frame take-up and rewind operations of the device of the first embodiment.

A normal one-frame take-up and rewind operation will now be described with reference to FIG. 11.

When the operation starts (Step S11), determination is made in Step S12 as to whether a release signal is inputted by an unillustrated release means. If so, an exposing operation is performed by an unillustrated exposure device in Step S13.

In Step S14, the motor 2 is driven forward and the film 8 is taken up as shown in FIG. 8. Then, determination is made in Step S15 as to whether the film 8 has been taken up by a predetermined amount. If so, the motor 2 is stopped in Step S16, thereby completing the one-frame take-up. If the film feed amount does not reach the predetermined amount within a predetermined time in Step S15, it is determined that the film 8 has been completely taken up, and the motor 2 is reversely driven in Step S18.

Then, the minor diameter planetary gear 13 engages with the spur gear 3a of the drive shaft 3, and the drive shaft 3 is rotated in the direction of the arrow and shifted rightward. As a result, the coupler 3c is connected to the coupler 4b of the rewinding drive shaft 4, and the fork shaft 6 and the spool shaft 5 are rotated in the rewind direction, that is, the direction of the arrow in the figure. Then, the film 8 is rewound by the fork shaft 6. The retaining nails 5b of the spool shaft 5 turn at a higher velocity than the film 8 according to the above condition VS0≧VR0, and run idle in the film 8 wound around the spool shaft 5.

Since the retaining nails 5b are so formed as not to project from the virtual arc on the flat surfaces of the spool shaft 5, the spool shaft 5 can rotate idly without making the film 8 slack.

If the film 8 is rewound by a predetermined amount or the film feed amount detection means does not detect the film transport for a predetermined time in Step S19, the motor 2 is stopped in Step S20 and the rewind operation of the film 8 is completed.

According to the first embodiment which operates as above, since the film 8 is taken up and rewound by the drive shaft 3 and the rewinding drive shaft 4 which can be detached from each other through the couplers 3c and 4b each functioning as a clutch, and convert the transmitted rotation force into the driving force in the rightward and leftward directions or the driving force into the rotation force by using the helical gears 3b and 4a, it is possible to provide a space-saving film transport device which has a simple mechanism and a small number of components.

FIGS. 12 to 16 each illustrate a second embodiment of the present invention. Though the helical gear 3b for transmitting the rotational driving force to the helical spur gear 5a of the spool shaft 5 is mounted to the drive shaft 3 which doubles as the transmission system in the above first embodiment, the transmission system is separated from the drive shaft and independently mounted as a second connecting shaft in the second embodiment.

In the second embodiment, since a motor 22, a reduction gear box 28, an output gear 29, a spool shaft 25, a helical spur gear 25a, retaining nails 25b, a fork shaft 26, a helical spur gear 26a, a rewinding drive shaft 24 as a first connecting shaft, a helical gear 24a, a film patrone 32, a film 33 and so on are similar in construction to those in the first embodiment, a detailed description thereof is omitted. Furthermore, it is needless to say that a camera body 21 which is partially illustrated in cross section is so constructed as to hold the inner mechanism of the camera.

A train of reduction gears are used without the planetary gear mechanism in the second embodiment. In other words, a reduction gear 30 is a double gear which is rotatably and pivotally supported by the reduction gear box 28. A major diameter spur gear 30a thereof is engaged with the output gear 29, a minor diameter helical spur gear 30b is engaged with a transmission gear 31 formed of a helical spur gear. The transmission gear 31 is also pivotally supported by the reduction gear box 28.

A drive shaft 23 is mounted coaxially with the rewinding drive shaft 24 in front of the motor 22, and is supported by the camera body 21 rotatably, pivotally and is slidable in the rightward and leftward directions in the figure. The drive shaft 23 is provided with a slotted coupler 23b at the left end, a helical gear 23a engaged with the above transmission gear 31 at the center, and a coupler 23c at the right end thereof.

In front of the helical spur gear 25a of the spool shaft 25, a spool shaft drive shaft 27 is horizontally extended as a second connecting shaft. The spool shaft drive shaft 27 is located coaxially with the drive shaft 23, and rotatably and pivotally supported by the camera body 21. Furthermore, the spool shaft drive shaft 27 is provided with a helical gear 27a engaged with the helical spur gear 25a of the spool shaft 25, and a coupler 27b detachable from the coupler 23b of the drive shaft 23 at the right end thereof.

At the right end of the rewinding drive shaft 24, a state detection switch 34 consisting of a leaf switch, which is turned off when the rewinding drive shaft 24 is shifted rightward, is supported by the camera body 21. A lead angle rR of the helical gear 24a of the rewinding drive shaft 24 and a lead angle rk of the helical gear 23a of the drive shaft 23 are in the relationship rk≦rR in the same manner as the first embodiment.

The operation of the film transport device of the second embodiment having the above construction will now be described.

Figure 12:
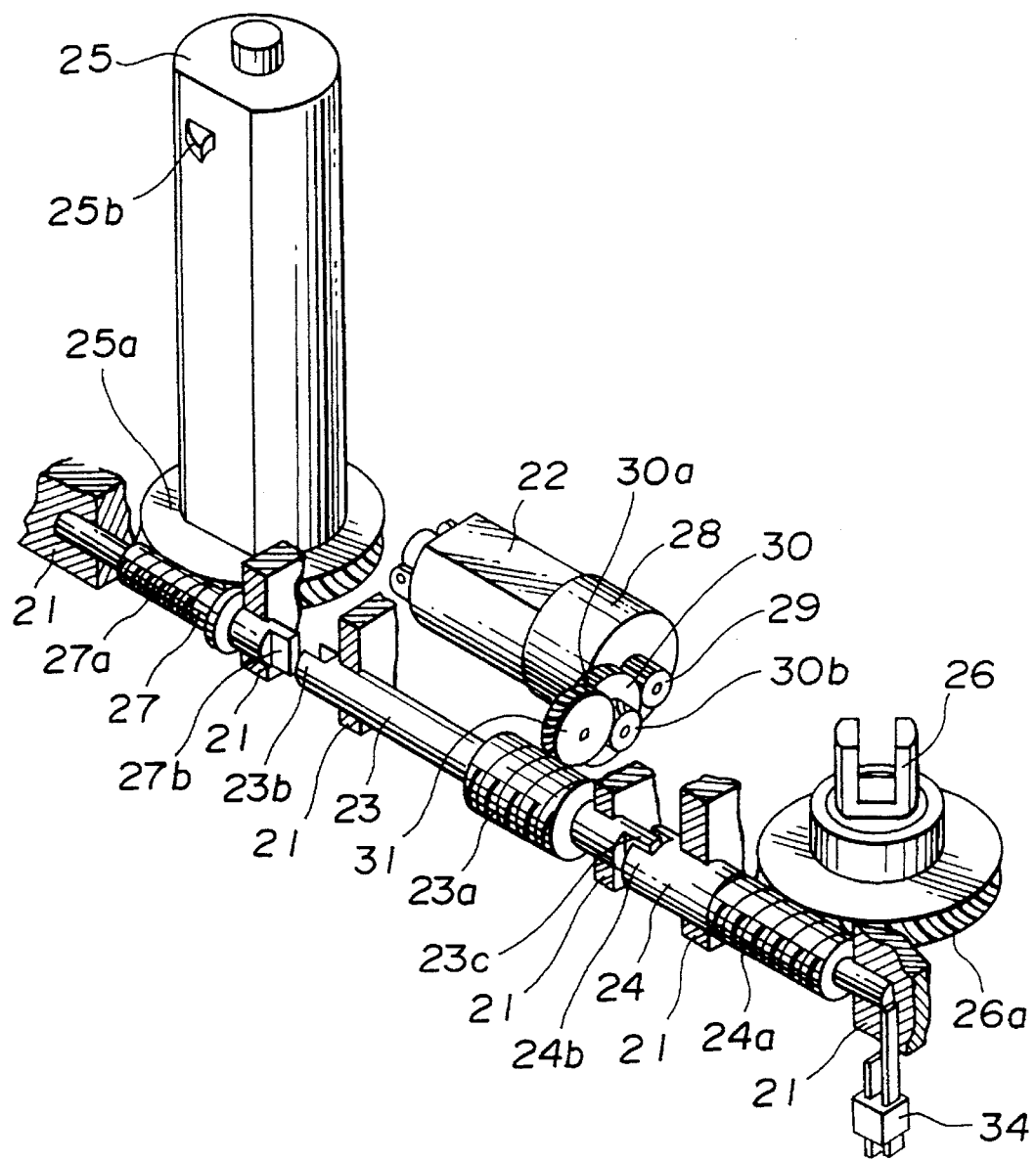
FIG. 12 is a perspective view illustrating the principal part of a film transport device of a camera according to a second embodiment of the present invention.
Figure 13:
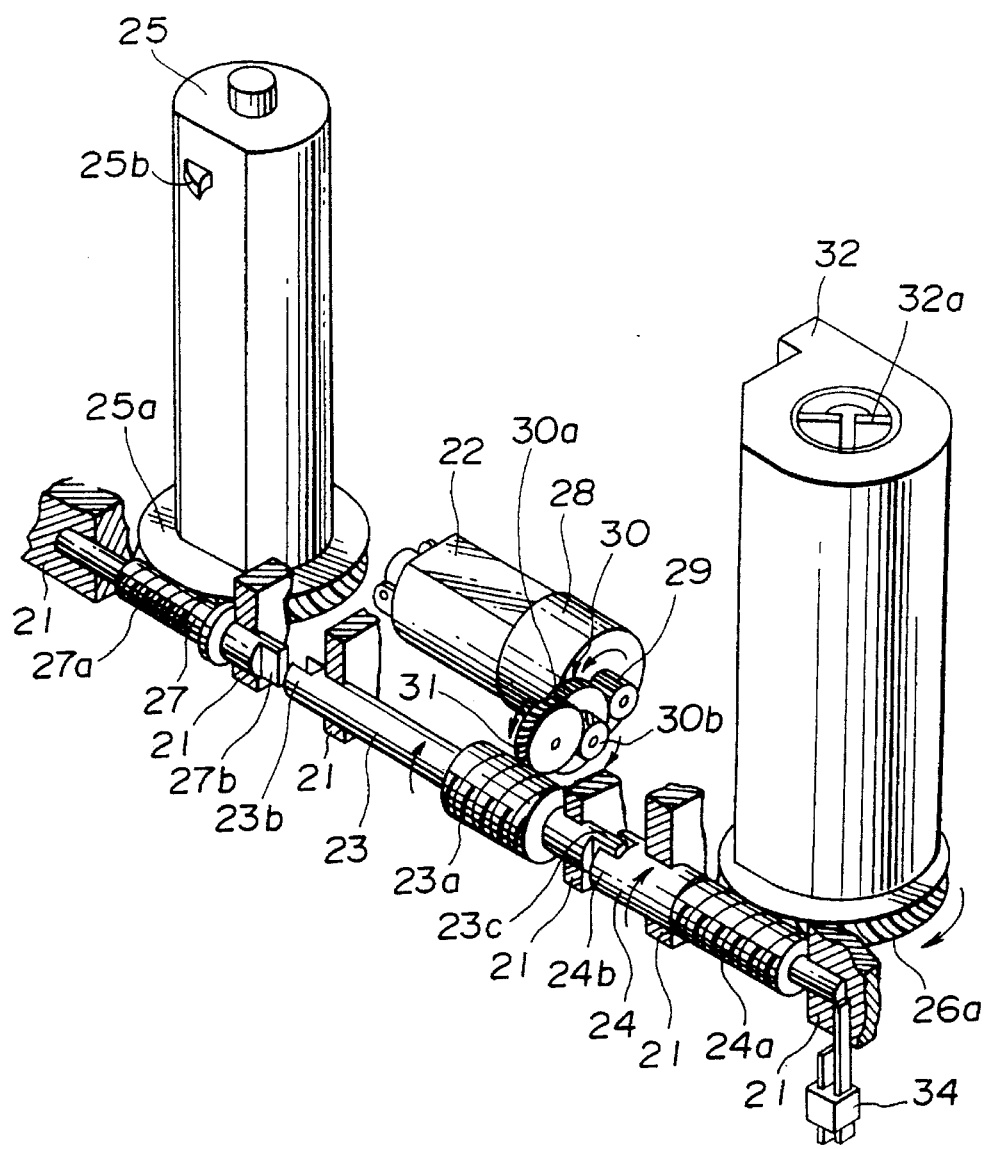
FIG. 13 is a perspective view illustrating the principal part of the reset state of the device according to the second embodiment.

The initial state is shown in FIG. 12. However, the exact positions of the drive shaft 23 and the rewinding drive shaft 24 in the figure are not obvious since they are changed by vibrations applied to the camera and so on. As shown in FIG. 13, when an unillustrated detection means detects that the patrone 32 is loaded, the motor 22 is driven backward for a predetermined period so as to shift the drive shaft 23 and the rewinding drive shaft 24 rightward in the figure.

Figure 14:
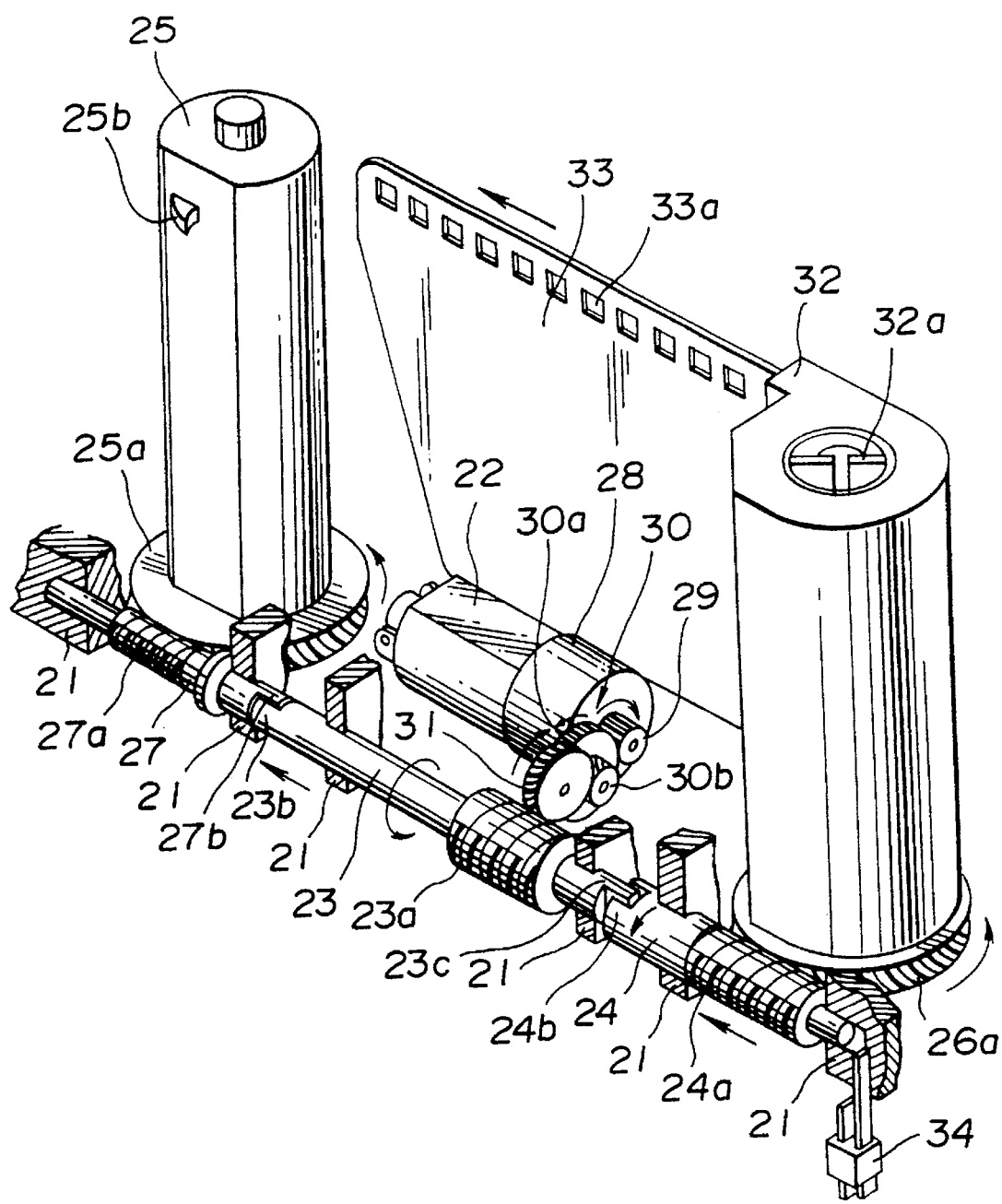
FIG. 14 is a perspective view illustrating the principal part of the film feed out state of the device according to the second embodiment.

Then, the motor 22 is driven forward as shown in FIG. 14, the drive shaft 23 and the rewinding drive shaft 24 are shifted to the left in the figure, the helical spur gears 25a and 26a are rotated, and the spool shaft 25 and the fork shaft 26 are driven. At this time, the state detection switch 34 is ON in response to the leftward shift of the rewinding drive shaft 24. Then, the film 33 is fed out by the rotation of the fork shaft 26 (FIG. 12).

Figure 15:
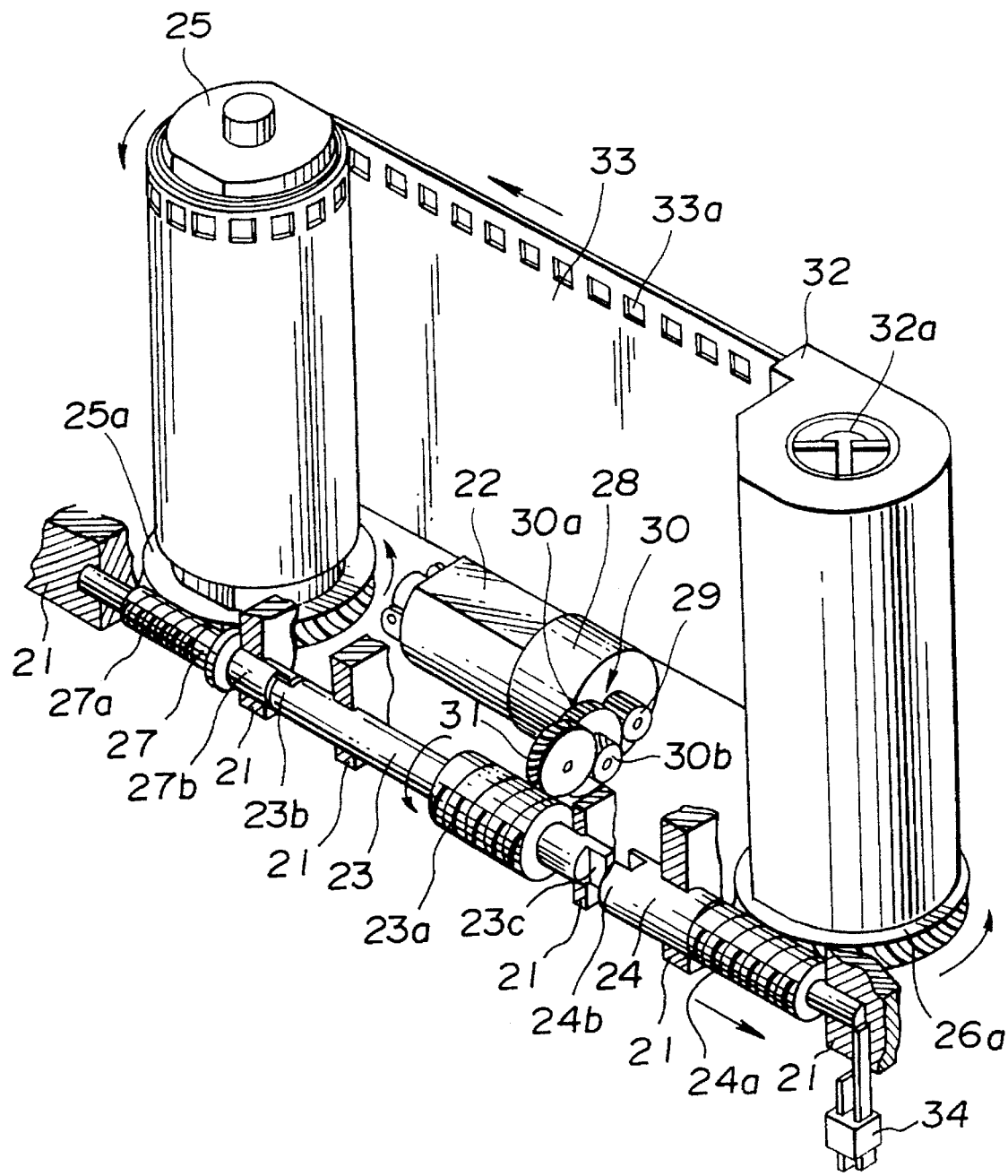
FIG. 15 is a perspective view illustrating the principal part of the film take-up state of the device according to the second embodiment.

As shown in FIG. 15, when perforations 33a of the film 33 are engaged with the retaining nails 25b of the spool shaft 25 and the film 33 is transported by the spool shaft 25, the film take-up velocity VS (see FIG. 15) of the spool shaft 25 and the film feed-out velocity VR of the fork shaft 26 are set so that VS≧VR (similar to the first embodiment), whereby the rewinding drive shaft 24 is shifted rightward and the state detection switch 34 is turned off. Since the motor 22 starts its forward rotation, the state detection switch 34 has been switched to off, on and off, the states of the state detection switch 34 are detected by an unillustrated detection means. Then, the success of the film feed out is displayed outward, i.e. along an exterior portion of the camera, by an unillustrated display means. When the motor 22 keeps on rotating forward and the film 33 is taken up by a predetermined amount, the automatic loading operation is completed. A normal one-frame take-up operation is performed by rotating the motor 22 forward in the state shown in FIG. 15 and taking up the film 33 by a predetermined amount.

Figure 16:
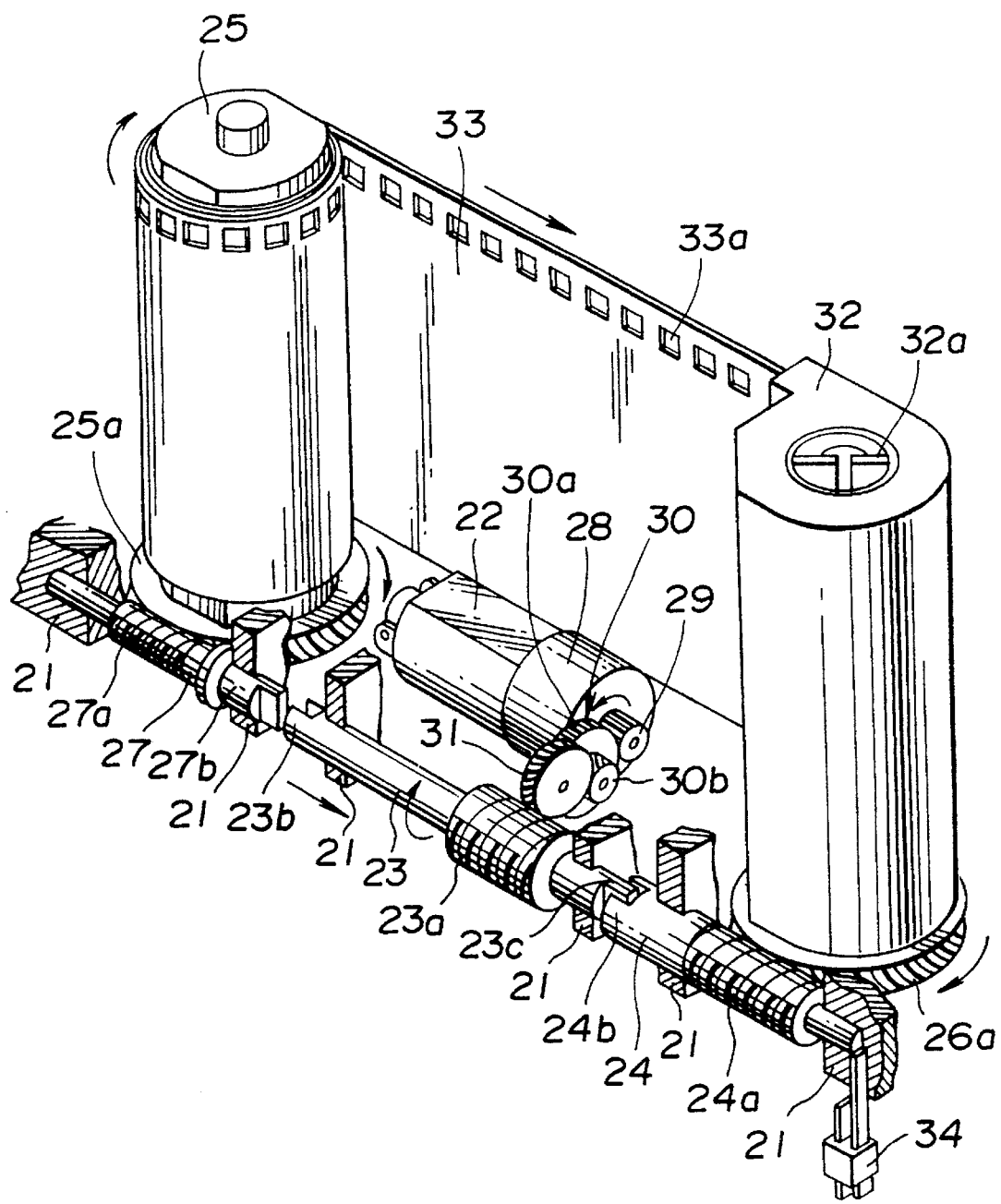
FIG. 16 is a perspective view illustrating the principal part of the film rewind state of the device according to the second embodiment.

The film 33 is rewound as shown in FIG. 16 by rotating the motor 22 backward, shifting the drive shaft 23 to be connected to the rewinding drive shaft 24, and rotating the fork shaft 26. At this time, since the spool shaft drive shaft 27 is separated from the drive shaft 23, the spool shaft 25 and the spool shaft drive shaft 27 follow the movement of the film 33. When the film 33 is rewound by a predetermined amount, the motor 22 is stopped and the rewind operation is completed.

In the second embodiment, the motor 22 is driven forward, the state detection switch 34 is switched from off to on in FIG. 14, and the switch 34 is waited for in the state shown in FIG. 15 for a predetermined time to be switched from on to off. If the switch 34 is not switched from on to off within a predetermined time, a warning of failure of film feed out is displayed, the motor 22 is rotated backward to rewind the film 33 and stopped after the completion of rewinding, thereby completing the operation. The operation is restarted by reloading the patrone 32.

According to the second embodiment, since the film take-up and rewind operations are performed by using the spool shaft drive shaft 27, the drive shaft 23 and the rewinding drive shaft 24 which can be detached to and separated from one another through the couplers 27b, 23b, 23c and 24b functioning as clutches and which convert the transmitted rotation force into the driving force in the rightward and leftward directions or the driving force into the rotation force through the helical gears 27a, 23a and 24a, it is possible to provide a space-saving film transport device which has a simple structure and a small number of components.

Furthermore, since the failure of the film feed out can be detected early according to the combination of the rotary direction of the motor 22 and the on/off state of the state detection switch 34, the consumption of a supply battery of the camera can be restricted. Still furthermore, since the camera is brought into the inoperative state at the failure of the film feed out, it is possible to avoid an unnecessary release and warn the user of the failure.

Though the rewinding drive shaft and the fork shaft, the drive shaft and the spool shaft, the drive shaft and the motor drive gear, and the spool shaft drive shaft and the spool shaft are respectively connected through the helical gears, it is needless to say that bevel gears, crown gears and so on may be used instead of the helical gears.

What is claimed is:

1. A camera which feeds a film out from a film patrone by rotating a film wind shaft in said film patrone in a film advance direction, comprising:

a drive source capable of selectively rotating forward and backward;

a fork shaft for rotating said film wind shaft in said patrone by being rotated in engagement with said film wind shaft;

a rotatable spool shaft for taking up said film fed out from said patrone;

a drive shaft rotatable about an axis of rotation being selectively rotated forward and reversely by said drive source, and capable of moving in either direction along the rotational axis;

a first connecting shaft coaxial with said drive shaft movable in the axial direction and rotatable upon engagement with said drive shaft and engaged with said fork shaft through a helical spur gear; and a second connecting shaft rotatable about its axis and coaxial with said drive shaft and having a helical spur gear engaging said spool shaft to rotate said spool shaft responsive to rotation of said drive shaft.

2. A camera according to claim 1, wherein a lead angle rk of said helical spur gear of said drive shaft and a lead angle rR of said helical spur gear of said first connecting shaft form a relationship $rk \leq rR$.

3. A camera according to claim 1, wherein said drive source is located on a said of a film path relative to said drive shaft so that a center axis thereof is substantially parallel to a center axis of said drive shaft.

4. A camera according to claim 1, further comprising position detection means for detecting a position of said first connecting shaft, and determination means for determining in response to a signal from said position detection means and a rotation direction of said drive source as to whether said film fed out from said patrone is wound on said spool shaft.

5. A camera according to claim 4, wherein said camera is brought into an inoperative state when a failure of the film feed out is detected by said determination means.

6. A camera according to claim 1, wherein said drive source comprises a motor having an output gear;

a planetary gear mechanism comprising a sun gear driven by said motor output gear and a pair of planetary gears meshing with said sun gear and swingably movable relative to an axis of rotation of said sun gear;

said planetary gears being selectively engageable with a driven gear provided on said drive shaft responsive to a given direction of rotation of said motor output gear; and one of said planetary gears being larger than the other one of said planetary gears.

7. A camera according to claim 6, wherein said sun gear comprises a pair of integral gears, one of said pair of gears having a diameter larger than the other one of said pair of gears; and the larger diameter gear engaging the output gear of said motor and the smaller diameter gear engaging said first and second planetary gears.

8. A camera according to claim 1, wherein said drive source comprises a motor;

said drive shaft being provided with helical gear means; and rotatable intermediate helical gear means driven by said motor for driving said drive shaft helical gear means.

9. A camera according to claim 8, wherein said motor has output gear means and further comprises an output gear driven by said motor and a pair of integral gears;

one of said integral gears meshing with the output gear driven by said motor and the other of said integral gears being a helical gear meshing with said intermediate helical gear means.

10. A camera according to claim 9, wherein said integral gear meshing with the output gear driven by said motor is larger than the helical gear meshing with said intermediate helical gear means.

11. A camera which feeds a film out from a film patrone by rotating a film wind shaft in said film patrone in a film advance direction, comprising:

a drive source capable of selectively rotating forward and backward;

a fork shaft for rotating said film wind shaft in said patrone by being rotated when engaged by said film wind shaft;

a rotatable spool shaft for taking up said film fed out from said patrone;

a drive shaft selectively rotated forward and reversely about an axis of rotation by said drive source, and capable of moving along said axis of rotation;

a first connecting shaft coaxial with said drive shaft and movable in the axial direction and rotatable when in engagement with said drive shaft and engaging said fork shaft through a helical spur gear; and a second connecting shaft coaxial with said drive shaft and rotatable about the axial direction and in engagement with said spool shaft through a helical spur gear to rotate said spool shaft when coupled to said drive shaft, wherein said film is fed out from said patrone and then wound on said spool shaft by rotating said fork shaft in said film advance direction through said first connecting shaft and rotating said spool shaft in said film take-up direction through said second connecting shaft responsive to rotation of said drive source in a predetermined direction, and said first connecting shaft and said drive shaft are disconnected by shifting said first connecting shaft in an axial direction away from said drive shaft in accordance with a difference in rotation velocity between said spool shaft and said fork shaft.

12. A camera which feeds a film out from a film patrone by rotating a film wind shaft in said film patrone in a film advance direction, comprising:

a drive source capable of selectively rotating forward and backward;

a fork shaft for rotating said film wind shaft in said patrone and being rotated when in engagement with said film wind shaft;

a rotatable spool shaft for taking up said film fed out from said patrone;

a drive shaft rotated forward and reversely about an axis of rotation by said drive source, and capable of moving in an axial direction along said axis of rotation;

a first connecting shaft coaxial with said drive shaft and movable in the axial direction and rotated and moveable in the axial direction when in engagement with said drive shaft and engaging said fork shaft through a helical spur gear; and a second connecting shaft coaxial with said drive shaft and engaging a helical gear on said spool shaft through a helical spur gear to rotate said spool shaft responsive to being coupled to said drive shaft and rotation of said drive shaft, wherein said fork shaft is rotated in a film rewind direction through said first connecting shaft responsive to the rotation of said drive source in a predetermined direction, and said drive shaft and said second connecting shaft are disconnected by shifting said drive shaft in a direction away from said connecting shaft in accordance with a difference in rotation velocity between said spool shaft and said fork shaft.

13. A camera which feeds a film out from a film patrone by rotating a film wind shaft in said film patrone in a film advance direction, comprising:

a drive source capable of selectively rotating forward and backward;

a fork shaft for rotating said film wind shaft in said patrone by rotating when engaged by said film wind shaft;

a rotatable spool shaft for taking up said film fed out from said patrone;

a drive shaft rotated forward and reversely about an axis of rotation by said drive source and capable of moving in an axial direction along said axis of rotation;

a first connecting shaft coaxial with said drive shaft and movable in the axial direction so as to be rotated together with said drive shaft while being engaged by said drive shaft and engaging a helical gear of said fork shaft through a helical spur gear; and a second connecting shaft coaxial with and selectively coupled to said drive shaft and and engaging a helical gear of said spool shaft through a helical spur gear so as to rotate said spool shaft upon the rotation of said drive shaft, wherein said film is fed out from said patrone and then wound on said spool shaft by rotating said fork shaft through said first connecting shaft in said film advance direction and rotating said spool shaft through said second connecting shaft in said film take-up direction responsive to rotation of said drive source in one direction, said first connecting shaft and said drive shaft being disconnected by shifting said first connecting shaft in the axial direction opposed to said drive shaft in accordance with a difference generated between a film take-up velocity of said spool shaft and a film feed out velocity of said fork shaft, and said drive shaft and said second connecting shaft being disconnected by rotating said fork shaft in a film rewind direction through said first connecting shaft responsive to rotation of said drive source in another direction and shifting said drive shaft in the axial direction away from said second connecting shaft in accordance with a difference in rotation velocity generated between said spool shaft and said fork shaft.

14. A camera in which a film patrone is loaded, comprising:

a drive source capable of selectively rotating forward and backward;

a fork shaft for rotating a film wind shaft in said patrone and being rotated when in engagement with said film wind shaft to feed out from or rewind a film into said patrone;

a rotatable spool shaft for taking up said film fed out from said patrone;

a drive shaft rotated forward and reversely about an axis of rotation by said drive source, and capable of moving in the axial direction along said axis of rotation;

a first connecting shaft coaxial with said drive shaft and movable in the axial direction and rotated when in engagement with said drive shaft and engaging said fork shaft through a helical spur gear; and a second connecting shaft coaxial with and selectively coupled to said drive shaft and engaging a helical gear of said spool shaft through a helical spur gear to rotate said spool shaft responsive to rotation of said drive shaft.

* * * * *